3,260,677
MANUFACTURE OF CATALYSTS
Harry Lister Riley, Worksop, and Richard Neville Bannister, Sheffield, England, assignors to United Coke and Chemical Company, Rotherham, England, a British company
No Drawing. Filed Sept. 19, 1963, Ser. No. 310,123
Claims priority, application Great Britain, Sept. 21, 1962, 36,019/62
12 Claims. (Cl. 252—426)

It has long been a common practice to produce catalysts in a form in which the catalytic material is supported on a carrier. The catalysts are generally particulate, varying in nature from quite fine powders to pellets of, say, ⅛ to ¼ inch size.

A very satisfactory method of making supported catalysts is described in application Serial No. 79,971 filed January 3, 1961, and comprises maintaining porous solid carrier particles and particles of at least one catalytic material in moving contact with one another at a temperature at which the catalytic material melts until the catalytic material is taken up by the porous particles. Preferably the particles are formed into a fluidized bed, but they may be tumbled together or agitated in a mechanical mixing device in order to maintain them in moving contact with one another. Mechanical mixing is particularly applicable to the manufacture of pellets, since these are difficult to fluidise.

Although these methods are in general very satisfactory, they suffer from a number of limitations. In particular, they are inconvenient to operate at temperatures in excess of 500° C. since it may become necessary to use plant made of alloy steel or lined with refractory material instead of plant made of mild steel. Furthermore certain widely used carriers such as silica gel and alumina shrink at high temperatures, causing uncontrolled changes in the properties of the final catalyst. This imposes an upper limit of about 500° C. on the temperature which can be used with these carriers with the consequence that our previous methods cannot readily be used when the melting point of the catalytic material is above this temperature.

This difficulty can sometimes be overcome by using solid particles of a compound of suitably low melting point which itself has no catalytic activity but on being subsequently treated on the carrier undergoes change and is thus converted into the catalytic material. An example is nickel nitrate, which may be used to produce a nickel catalyst. However, this in turn brings with it the disadvantage that when the nickel nitrate is decomposed on the carrier harmful oxides of nitrogen are produced.

The present invention is based on the use of a fluxing agent having the property of enabling the catalytic material to pass from the solid state into a liquid phase at a temperature substantially below its melting temperature or, if the catalytic material decomposes without melting, at a temperature below its decomposition temperature, so that the catalytic material can be distributed over the carrier particles at a suitably low temperature. Thus according to the invention we mix together solid carrier particles, solid particles of catalytic material and solid particles of such fluxing agent, and maintain the carrier particles in motion in the resultant mix at a temperature at which the liquid phase exists until the catalytic material is taken up by the carrier particles.

The term "catalytic material" includes not only materials possessing catalytic properties but also those which yield a material possessing catalytic properties only after undergoing thermal decomposition or chemical reaction, e.g., oxidation or reduction, after they have been taken up by the carrier particles or while they are being so taken up.

The nature of the liquid phase varies with the fluxing agent and the catalytic material, and in it the catalytic material may be present as a complex, or in solution, or both, or again the phase may be of the kind often called a fused melt. It may be viscous, and sometimes can even aptly be described as a paste.

The temperature at which the fluxing agent becomes effective to produce the liquid phase is, of course, above the melting point of the fluxing agent, and should be substantially below the melting point (or below the decomposition temperature) of the catalytic material.

It is necessary, of course, to choose the carrier particles with proper regard to both the catalytic material and the reaction in which the catalyst is to be used. We prefer porous materials. These may be silica gel, alumina, pumice, carbon, zeolite, clays, ceramic powders or metallic oxides, provided that they have the required specific surface and pore diameter and are stable at the highest temperature to which they are subjected in the manufacture or use of the catalyst. The liquid phase in the mixture is absorbed by porous particles, and even if the fluxing agent is partly absorbed before fluxing all the catalytic material the result is still satisfactory. The more porous the carrier is, the greater is the proportion of the fluxed catalytic material which can be taken up. We have however obtained satisfactory coatings on particles of glass, on which the liquid phase is adsorbed.

The invention can be used for the production of a catalyst containing more than one catalytic material. These materials may be taken up by the carrier particles in one stage or in separate stages. In a two-stage process, one catalytic material may be taken up by the carrier particles without the aid of a fluxing agent, and the second catalytic material may then be taken up by these carrier particles with the use of a fluxing agent, or the procedure may be reversed. An example of a catalytic material which we find it convenient to introduce without the use of a fluxing agent is metallic bismuth, as this melts at a conveniently low temperature.

An important feature of the invention is that we start with the carrier, catalytic material and fluxing agent all in solid particulate form. The process is particularly conveniently carried out in a fluidised bed of the carrier particles, but mechanical mixing of the particles may also be used, particularly for manufacturing catalysts in the form of pellets.

When a fluidised bed is used, the carrier particles may conveniently be in the size range of 75 to 500 microns. It is convenient to mix the particles of fluxing agent and catalytic material with a minor proportion of the carrier particles, and to introduce this mixture gradually into a fluidised bed of the remainder of the carrier particles. Care must be taken not to add the fluxing agent or a mixture containing its so rapidly that the carrier particles stick together and form large aggregates. When larger particles are used in a mixing drum there is not the same risk and this process can be carried on more quickly.

The fluxing agent may be organic and removed by heating after it has served its purpose, or be inorganic and form part of the final catalyst. Particularly in a fluidized bed process the removal is preferably effected by raising the temperature of the bed to a value at which the fluxing agent is decomposed but it is possible to decompose it in an oven as a separate step.

Oxalic acid and urea are most suitable because they decompose and yield an effluent gas which is not objectionable. Oxalic acid may be used with advantage with catalytic materials with which it forms a coordination-complex compound, and urea with catalytic materials which dissolve in it. Other examples of organic fluxing agents are tartaric acid and citric acid, but these compounds are less suitable in practice, firstly because they are more expensive than either oxalic acid or urea, and secondly because they tend to decompose with the deposition of carbon onto the carrier particles, and this must subsequently be burnt off. In any case, to enable the whole process to be carried on in a single vessel at the desired low temperature, the organic fluxing agents should preferably decompose at temperatures below 400° C.

We find that a very wide range of catalytic materials, in particular metallic oxides, can be deposited onto carrier particles at temperatures below 150° C. with the use of an organic fluxing agent, and that the fluxing agent can then be decomposed at temperatures of about 400° C. In many cases a catalytic metallic oxide can be mixed as such with the fluxing agent, but alternatively an appropriate salt can be used and be decomposed to yield the oxide by subsequently heating. As an example a molybdenum trioxide catalyst may be produced with the use of oxalic acid as a fluxing agent by using either particles of the trioxide or particles of ammonium molybdate. In the latter case the molybdate will decompose to yield the oxide and ammonia at about 250° C. in the course of the heating employed to decompose the oxalic acid.

Commercial oxalic acid is $(COOH)_2 \cdot 2H_2O$, and the water of hydration appears to be essential in the fluxing, possibly because it forms part of a complex formed with the catalytic material. However this may be, we find it highly desirable to pass steam through the mixture of particles during the process, particularly when the fluxing agent is oxalic acid, the steam presumably serving to retard the decomposition of the fluxing agent or of a complex formed from it.

An organic fluxing agent must generally be present in molar excess over the catalytic material it is to flux, but the ratio depends on the particular combination of fluxing agent and catalytic material, probably being determined by the mechanism by which fluxing occurs. However, the amount necessary to flux the catalytic material can easily be found by experiment.

In carrying out the invention when the fluxing agent forms part of the final catalyst, we use an inorganic compound which forms a melt with the solid particles of the catalytic material at a temperature substantially below the melting point of the catalytic material. The fluxing agent in this case may itself enhance the catalytic properties of the final catalyst. An example of a fluxing agent of this kind is potassium pyrosulphate, which when heated with vanadium pentoxide forms a glass of low melting point. This glass can be deposited on a carrier to yield a catalyst, for example, for use in the oxidation of naphthalene to phthalic anhydride, which is much more effective than vanadium pentoxide itself.

Such a glass has previously been made as such, as described in our British specification No. 904,971, by dissolving vanadium pentoxide in molten potassium pyrosulphate and allowing the solution to cool and harden, the resultant glass being ground into a powder. This powder has then been absorbed by porous carrier particles by the method described in Serial No. 97,971.

By the present invention this catalyst can be made in a single vessel, simply by maintaining a mixture of the potassium pyrosulphate, vanadium pentoxide and carrier particles in motion at a temperature, e.g., 420° C., at which the pyrosulphate serves as a fluxing agent. The resultant catalyst is satisfactory, and substantial savings in the cost of its production are effected by means of the invention.

Other similar inorganic fluxing agents which remain in the catalyst and are not subsequently decomposed are rubidium pyrosulphate, caesium pyrosulphate, thallium pyrosulphate, potassium dichromate and sodium hydrogen sulphate.

Although catalyst pellets may be made by the use of carrier particles of pellet size in a mechanical mixer they may also be formed by pelletizing catalyst particles produced in a fluidised bed. Such relatively small carrier particles which have taken up the catalytic material at a low temperature (e.g., 150° C.) at which the physical properties of the carrier are substantially unaltered will form mechanically strong pellets, whereas catalyst particles which have been heated to higher temperatures may not do so.

Some examples will now be given. In the first ten of these the particles were fluidized in a column, 2 inches in diameter, surrounded by an electrical heater by which the contents in the column were heated. The fluxing agent was organic and when all the catalytic material had been taken up the temperature was raised to decompose the fluxing agent.

Example 1

A mixture consisting of 29 g. ammonium metavanadate, 116 g. oxalic acid $[(COOH)_2 \cdot 2H_2O]$ and 200 g. of microspheroidal corundum was added over a period of 1 hour to 400 g. of the corundum, which was fluidized at a temperature of 120° C. by air enriched with steam. The ammonium vanadate and oxalic acid had then been fully taken up by the carrier particles. The temperature of the fluidized bed was raised to 400° C. and the fluidising continued for 3 hours. The ammonium vanadate was decomposed to vanadium pentoxide and ammonia, and the oxalic acid was driven off as water and oxides of carbon. The resultant catalyst consisted of 96.4% $Al_2O_3$ and 3.6% $V_2O_5$

Example 2

600 g. of microspheroidal corundum were fluidized with air at 120° C., and a mixture of 43.5 g. ammonium vanadate, 180 g. oxalic acid, 17.6 g. anhydrous stannous chloride and 300 g. of corundum, all of which passed through a B.S.S. 30 mesh sieve, was added slowly to the corundum in the column over a period of two hours. The temperature of the bed was then increased to 400° C. and held at that temperature for one hour until all organic matter had been removed. The catalyst was then cooled and removed from the column.

The nominal composition of the finished catalyst was: corundum 94.%, $V_2O_5$ 3.6%, $SnO_2$ 1.5%. This catalyst was used for the ammoxidation of xylenes.

Example 3

200 g. of silica gel were fluidised at 120° C. by air enriched with steam. A mixture of 30 g. of molybdenum trioxide, 120 g. oxalic acid and 100 g. silica gel, all of which passed through a B.S.S. 30 mesh sieve, was added slowly to the silica gel in the column over a period of half an hour and the fluidising continued with air alone it 400° C. for half an hour, after which the catalyst was cooled and removed.

The nominal composition of the finished catalyst was: $MoO_3$ 9.1%, silica gel 90.9%.

Example 4

200 g. of silica gel (specific surface 330 m.²/g., average pore diameter 90 A.), were fluidized at 120° C. by air saturated with steam at 90° C. A mixture of 18.3 g. ammonium molybdate, 73 g. of oxalic acid and 100 g. of silica gel was added over a period of 1 hour. After this hour the temperature was raised to 250° C., and in the course of 2 hours the ammonium molybdate decomposed to yield molybdenum trioxide and ammonia and the oxalic acid fluxing agent was driven off as oxides of carbon and water. The resultant catalyst consisted of 4.7% molybdenum trioxide and 95.3% silica.

Example 5

To make a catalyst with a nominal composition of 6.0% molybdenum trioxide, 1.1% cobalt oxide and 92.9% alumina, 39.5 g. of ammonium molybdate, 18.4 g. of cobalt chloride hexahydrate, 120 g. oxalic acid and 180 g. of activated alumina of 30–200 B.S.S., were mixed and added to 320 g. of the alumina, which was fluidised at 120° C. by air saturated with steam at 90° C., over a period of 1 hour. The oxalic acid was decomposed by raising the temperature to 400° C. for 2 hours.

Example 6

26.2 g. cuprous chloride, 78.5 g. urea and 200 g. activated alumina were mixed and added over a period of 1 hour to 300 g. of the activated alumina, which was fluidized at 140° C. by air. The urea was decomposed by raising the temperature to 400° C. for 2 hours. The nominal composition of the catalyst was 5% cuprous chloride and 95% alumina.

Example 7

This is an example of the production of a vanadium pentoxide catalyst with tartaric acid as the fluxing agent. 19.2 g. of ammonium vanadate, 80 g. of tartaric acid and 100 g. of silica gel (specific surface 330 m.²/g., average pore diameter 90 A.) were mixed and added over a period of 1 hour to 200 g. of the silica gel, which was fluidized at 120° C. by air enriched with steam. Upon subsequently raising the temperature to 450° C. the ammonium vanadate was converted into vanadium pentoxide, while the tartaric acid was carbonized. The carbon deposit was burnt away rather slowly, and it took a further five hours to produce the resultant catalyst, consisting of 4.7% vanadium pentoxide and 95.3% silica gel.

Example 8

101 g. nickel acetate, 200 g. urea and 100 g. silica gel (specific surface 330 m.²/g., average pore diameter 90 A.) were mixed and added over a period of 1.5 hours to 200 g. of the silica gel, which was fluidized at 140° C. with air. On subsequent heating for 2.5 hours at 400° C. the resultant product was a catalyst of nominal composition 9.2% nickel oxide (NiO) and 90.8% silica gel.

Example 9

30 g. molybdenum trioxide, 120 g. oxalic acid and 100 g. silica gel (specific surface 330 m.²/g., average pore diameter 90 A.) were mixed and added over a period of 1 hour to 200 g. of the silica gel, which was fluidized at 120° C. by air enriched with steam. On subsequent heating for 2 hours at 400° C. a catalyst of the nominal composition 9.1% molybdenum trioxide and 90.9% silica gel was obtained.

Example 10

400 g. of silica gel were fluidized with air at 420° C. A mixture of 169 g. potassium pyrosulphate, 30.6 g. vanadium pentoxide and 200 g. silica gel, all of which passed through a B.S.S. 30 mesh sieve, was added slowly to the silica gel in the column over a period of 3 hours; the mixture was further fluidised at 420° C. for further 3 hours and then cooled and removed. The completed catalyst consisted of 3.8% vanadium pentoxide, 21.2% potassium pyrosulphate and 75% silica gel, and gave good conversions in the oxidation of naphthalene to phthalic anhydride.

In the next two examples the same column was used, but the composite catalyst was made in two stages.

Example 11

Stage 1.—8.5 g. powdered metallic bismuth were mixed with 100 g. pumice and added over a period of 1 hour to 715 g. of pumice which was fluidized at 300° C. by nitrogen.

Stage 2.—35.3 g. ammonium metavanadate, 140 g. oxalic acid and 200 g. of bismuth-impregnated pumice withdrawn from the column were mixed and added over a period of two hours to the remained of the bismuth-impregnated base in the column while fluidizing at 120° C. with air. On subsequently raising the temperature of the column to 400° C. for two hours a catalyst of nominal composition 1.0% bismuth oxide, 3.2% vanadium pentoxide and 95.8% pumice was produced.

Example 12

Stage 1.—83.5 g. metallic bismuth and 200 g. silica gel (specific surface 330 m.²/g., average pore diameter 90 A.) were mixed and added to 423.3 g. silica gel over a period of two hours while fluidizing at 300° C. with nitrogen.

Stage 2.—200 g. of the bismuth-impregnated silica gel was removed and mixed with 100 g. dodecaphosphomolybdic acid and 200 g. urea. The mixture was added to the remainder of the bismuth-impregnated base over a period of two hours, while fluidising at 140° C. with air. On subsequently raising the temperature of the column to 400° C. for two hours a catalyst of nominal composition 11.7% bismuth oxide, 9.6% molybdenum trioxide, 0.4% phosphorus pentoxide and 78.3% silica gel was formed.

In the final two examples catalyst pellets were produced in a tumbler mixer, all the solid particles being put in the tumbler and the temperature slowly raised until it was above the melting point of the flux.

Example 13

200 g. of ⅛ inch corundum pellets were put into the tumbler together with 7.7 g. ammonium vanadate and 29 g. oxalic acid. The tumbler was rotated and the temperature raised slowly to 125° C. over a period of 45 minutes. Steam was passed through the tumbler for the last ten minutes of this period. The catalyst was then removed and heated at 400° C. for 4 hours in the presence of air. The prepared catalyst contained 2.9% $V_2O_5$ and was suitable as a static bed catalyst for the oxidation of naphthalene to phthalic anhydride.

Example 14

100 g. silica gel, 33.5 g. nickel acetate tetrahydrate and 33.5 g. urea were put into the tumbler and rotated at 190° C. for 45 minutes. The catalyst was then cooled and removed and then heated to 400° C. in a muffle furnace for 1 hour. This catalyst contained 10% nickel oxide and was suitable for use in the hydrogenation of unsaturated oils.

Other catalysts which have been made by means of the invention are as follows:

| Carrier | Catalytic material | Fluxing agent | Molar ratio of flux to catalytic material | Temp. of preparation, °C. | Decomposition temperature, °C. | Steam | Composition of catalyst | Use |
|---|---|---|---|---|---|---|---|---|
| Corundum | $NH_4VO_3$ and $SnCl_2$ | Oxalic acid | 4:1 | 120 | 400 | Yes | 3.6% $V_2O_5$, 1.5% $SnO_2$ | Ammoxidation. |
| Silica gel | Nickel Acetate | Urea | 2:1 | 140 | 400 | No | 5% NiO | Hydrogenation. |
| Corundum | $NH_4VO_3$ | Citric acid | 4:1 | 120 | 400 | Yes | 3% $V_2O_5$ | Oxidation. |
| Silica gel | $NH_4VO_3$, $K_2SO_4$, basic ferric acetate | Oxalic acid | 3:1 | 120 | 400 | Yes | 6% $V_2O_5$, 2.5% $Fe_2O_3$, 1.5% $K_2SO_4$. | Anthracene oxidation. |
| Corundum | $V_2O_5$, $SnCl_2$ | ---do--- | 3:1 | 120 | 400 | No | 2.34% $V_2O_5$, 1% $SnO_2$ | Ammoxidation. |
| Mullite | $NH_4VO_3$, $SnCl_2$ | ---do--- | 4:1 | 120 | 400 | Yes | 3.5% $V_2O_5$, 1.5% $SnO_2$ | Do. |
| Alumina | Cobalt acetate | Urea | 2:1 | 140 | 400 | No | 5% CoO | Hydrogenation. |
| Silica gel (calcined) | $NH_4VO_3$, $SnCl_2$ | Oxalic acid | 4:1 | 120 | 400 | No | 3.5% $V_2O_5$, 1.5% $SnO_2$ | Ammoxidation. |
| Alumina | $NH_4VO_3$, $MoO_3(NH_4)$, $H_3PO_4$. | ---do--- | 4:1 | 120 | 400 | No | $V_2O_5$, $MoO_3$, $P_2O_5$ | Do. |
| Blast furnace slag. | $NH_4VO_3$, $SnCl_2$ | ---do--- | 4:1 | 120 | 400 | No | 3.5% $V_2O_5$, 1.5% $SnO_2$ | Do. |
| Corundum | $NH_4VO_3$, $SnCl_2$ | ---do--- | 4:1 | 120 | 400 | No | 3.5% $V_2O_5$, 1.5% $SnO_2$ | Do. |
| Do | $NH_4VO_3$ | ---do--- | 4:1 | 120 | 400 | No | 3.5% $V_2O_5$ | Do. |
| Mullite | $NH_4VO_3$, $SnCl_2$ | ---do--- | 4:1 | 120 | 400 | No | 3.5% $V_2O_5$, 1.5% $SnO_2$ | Do. |
| Alumina | Ammonium molybdate, cobalt chloride. | ---do--- | 2:1 | 120 | 400 | Yes | 1.1% CoO, 6% $MoO_3$ | Desulphurisation. |
| Do | Ammonium acetate, cobalt acetate. | Urea | 3:1 | 140 | 400 | No | 1.1% CoO, 6% $MoO_3$ | Do. |
| Silica gel | $V_2O_5$ | $K_2Cr_2O_7$ | | 420 | | No | 5% $V_2O_5$, 20% $K_2Cr_2O_7$ | Oxidation. |
| Do | $V_2O_5$ | $K_2S_2O_7$ | | 400 | | No | 3.8% $V_2O_5$, 21.2% $K_2S_2O_7$ | $C_{10}H_8$ oxidation. |
| TWO-STAGE PREPARATION | | | | | | | | |
| Corundum | (1) Ammonium vanadate. (2) Chromic oxide | Oxalic acid | 4:1 | (1) 120 (2) 190 | 300 400 | Yes No | 3% $V_2O_5$ 3% $CrO_3$ | Ammoxidation. |
| Microspheroidal silica-alumina. | (1) Bismuth (2) Ammonium vanadate and stannous chloride. | Oxalic acid | 4:1 | (1) 300 (2) 120 | 400 | No No | 3.5% $V_2O_5$ 1.5% $SnO_2$, 1.1% $Bi_2O_3$ | Do. |
| Corundum | (1) Ammonium vanadate. (2) Lead acetate | ---do--- | 4:1 | (1) 120 (2) 300 | 400 | No No | 4% $V_2O_5$ 1% PbO | Do. |
| *The following are further catalysts which have been made in pellet form in a tumbler* | | | | | | | | |
| Corundum, ⅛" diameter. | $NH_4VO_3$, ammonium molybdate $(NH_4)H_2PO_4$. | Oxalic acid | 2:1 | 120→190 | 400 | No | 3% $V_2O_5$, 1% $MoO_3$, 0.25% $P_2O_5$. | Oxidation. |
| Alumina, ⅛" diameter. | Ammonium molybdate, cobalt acetate. | Urea | 4:1 | 140→190 | 400 | No | 12.5% $MoO_3$, 3.5% CoO | Desulphurisation. |

We claim:

1. A method for the preparation of a catalyst comprising forming a mixture by combining solid particles of a catalytic material, solid particles of a carrier, and solid particles of a flexing agent, said fluxing agent having the property of enabling the catalytic material to pass into the liquid phase at a temperature above ambient, but below the melting or decomposition point of the catalytic material whichever is lower, said flexing agent being added in sufficient amounts to cause said passage into the liquid phase at said temperature, and heating said mixture to a temperature at which said liquid phase exists and is taken up by the carrier particles.

2. A method for the preparation of a catalyst comprising forming a mixture by combining solid particles of a catalytic material, solid particles of a carrier and solid particles of a fluxing agent, said fluxing agent having the property of causing the catalytic material to pass into the liquid phase at a temperature above ambient, but below the melting or decomposition point of the catalytic material whichever is lower, said fluxing agent being added in sufficient amounts to cause said passage into the liquid phase at said temperature, agitating said mixture, and heating said mixture to and maintaining it at said temperature at which said liquid phase exists until said liquid phase is taken up by the carrier particles.

3. The method of claim 2 wherein agitation of the mixture is accomplished by fluidizing a bed of said mixture.

4. A method according to claim 3 in which a major proportion of the carrier particles are formed into the fluidized bed and the remainder of the carrier particles, the fluxing agent and the catalytic material, are gradually introduced into this bed.

5. A method for the preparation of a catalyst comprising forming a mixture by combining solid particles of a catalytic material, solid particles of a carrier, and solid particles of a fluxing agent, said fluxing agent being an organic material and having the property of enabling the catalytic material to pass into the liquid phase at a temperature above ambient, but below the melting or decomposition point of the catalytic material whichever is lower, and heating said mixture to a temperature at which said liquid phase exists and is taken up by the carrier particles.

6. A method for the preparation of a catalyst comprising mixing together solid particles of a catalytic material, solid particles of a carrier, and solid particles of a fluxing agent, said fluxing agent being an organic material and having the property of causing the catalytic material to pass into the liquid phase at a temperature above ambient, but below the melting or decomposition point of the catalytic material whichever is lower, agitating the mixture, and heating said mixture to and maintaining it at said temperature at which said liquid phase exists until said liquid phase is taken up by the carrier particles.

7. A method according to claim 6 in which the fluxing agent is oxalic acid and the catalytic material is a material which forms a coordination complex compound with the oxalic acid.

8. A method according to claim 6 in which steam is passed through said mixture while said liquid phase is being taken up by the carrier particles.

9. A method according to claim 6 in which the fluxing agent is urea and the catalytic material is dissolved in the melted urea at said temperature.

10. The method of claim 6 wherein agitation of the mixture is accomplished by fluidizing a bed of said mixture.

11. A method according to claim 10 in which a major proportion of the carrier particles are formed into the fluidized bed and the remainder of the carrier particles, the fluxing agent and the catalytic material, are gradually introduced into this bed.

12. A method for the preparation of a catalyst comprising forming a mixture by combining solid particles of a catalytic material, solid particles of a carrier and solid particles of a fluxing agent consisting of potassium dichromate, said fluxing agent having the property of causing the catalytic material to pass into the liquid phase at a temperature above ambient, but below the melting or decomposition point of the catalytic material whichever is lower, agitating said mixture, and heating said mixture to and maintaining it at said temperature at which said liquid phase exists until said liquid phase is taken up by the carrier particles.

References Cited by the Examiner

UNITED STATES PATENTS

| | | | |
|---|---|---|---|
| 1,374,233 | 4/1921 | Reinhold | 148—23 |
| 1,882,734 | 10/1932 | Barber | 148—23 |
| 2,351,974 | 6/1944 | Kollmar | 106—1 |
| 2,863,879 | 2/1956 | Tribit | 252—456 XR |
| 2,898,255 | 8/1959 | Thompson et al. | 148—23 |
| 3,038,911 | 6/1962 | Berets et al. | 252—456 |
| 3,182,027 | 4/1965 | Riley | 252—440 |

OSCAR R. VERTIX, *Primary Examiner.*

MAURICE A. BRINDISI, *Examiner.*

R. M. DAVIDSON, A. GRIEF, *Assistant Examiners.*